United States Patent Office 3,227,714
Patented Jan. 4, 1966

3,227,714
ACETYLKETENE AMINALS
James C. Martin, Kingsport, Tenn., assignor to Eastman Kodak Company, Rochester, N.Y., a corporation of New Jersey
No Drawing. Filed Oct. 9, 1963, Ser. No. 314,854
5 Claims. (Cl. 260—246)

This invention relates to novel chemical compounds and to a method of preparing them and more particularly to acetylketene aminals and to their preparation by combining a ketene with a ketene aminal or N,N-acetal having at least one α-hydrogen atom.

The method of the invention and the compounds prepared by it can be represented by the equation:

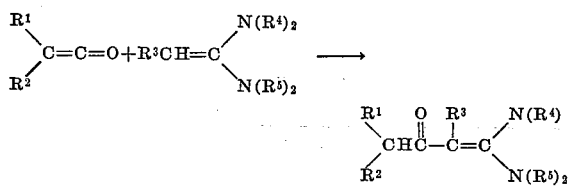

The substituents $R^1$, $R^2$ and $R^3$ of the ketene and the ketene aminal, taken singly, can be selected from a broad class of monovalent substituents including hydrogen, halogen atoms, and organic radicals having up to about 8 carbon atoms that are free of labile hydrogen atoms, e.g., as in amino and hydroxyl groups. These can include, for example, such monovalent organic radicals as: alkyl and cycloalkyl, particularly lower alkyl, cyclopentyl and cyclohexyl; phenyl and phenyl substituted with one or more lower alkoxy radicals; thienyl; alkenyl, particularly lower alkenyl; and carbalkoxy. Taken collectively, $R^1$ and $R^2$ of the ketene can also be an alkylene radical that forms with the carbon to which $R^1$ and $R^2$ are attached a 4 to 6 membered carbocyclic ring, e.g., as in cyclopentane and cyclohexane. Preferably $R^1$ and $R^2$ are hydrogen, lower alkyl or lower alkylene.

The amino substituents $R^4$ and $R^5$ of the ketene aminal taken singly, are monovalent hydrocarbon radicals of up to about 8 carbon atoms which are free of non-aromatic unsaturation, e.g., alkyl, cycloalkyl, phenyl, and lower alkyl-substituted phenyl. Taken collectively, each pair of substituents $R^4$ and $R^5$ can be the atoms necessary to complete a heterocyclic ring with the nitrogen atom, e.g., piperidino, morpholino, thiamorpholino, pyrrolidinyl, etc.

The product of the invention are thus acetylketene aminals by which term I mean to include substituted acetylketene aminals when $R^1$, $R^2$ and $R^3$ are other than hydrogen. They can also be referred to as acetylketene N,N-acetals or as 1,1-bis(tertiaryamino)-1-buten-3-ones.

Typical examples of ketene of the formula $$R^1R^2C=C=O$$

that can be employed in the reaction include ketene, methylketene, ethylketene, n-propylketene, isopropylketene, n-butylketene, isobutylketene, phenylketene, dimethylketene, ethylmethylketene, diethylketene, n-butylethylketene, di-n-propylketene, diisobutylketene, di-n-butylketene, di-n-heptylketene, ethyldodecylketene, dioctadecylketene, camphoketene, dibenzylketene, ditolylketene, diallylketene, dicarbethoxyketene, dichloroketene, tetramethyleneketene, pentamethyleneketene, diphenylketene, methylphenylketene, allylmethylketene, methylcarbethoxyketene, ethylcarbethoxyketene, n - propylcarbomethoxyketene, and the like.

An important characteristic of the method of the invention is that the ketene aminal must have at least one hydrogen atom on the α-carbon atom. Such ketene aminals of the formula

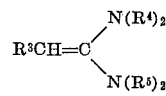

which are suitable for the method of the invention can be prepared by procedures disclosed by Baganz et al., Ber. 95, 2095 (1962) and by the earlier references cited therein. Examples of suitable ketene aminals for the method of the invention include: 4,4'-vinylidenedimorpholine, 1,1'-vinylidenedipiperidine, N,N'-vinylidene bis(dimethylamine), 1,1' - vinylidenedipyrrolidine, N,N'-vinylidene bis(N-methylaniline), 4,4'-propenylidenedimorpholine, 4,4'-(1-butenylidene)dimorpholine, N,N'-vinylidene bis(dibutylamine), etc.

In the practice of the invention, I normally use an equimolar ratio of ketene to ketene aminal although an excess of the aminal is sometimes beneficial. The reaction can be carried out over a wide range of temperatures at which the reaction mixture is liquid, e.g., from about —20° C. to 200° C. but temperatures of 25 to 180° C. are preferred.

For the lower members of the series of reactants the reaction is quite exothermic. Therefore it is usually desirable, though not essential, to use a solvent. Suitable solvents include those that do not react with the products or the starting materials and can be either polar or non-polar. Examples of suitable inert solvents include ethers, e.g., diethyl ether, diisopropyl ether, tetrahydrofuran, etc.; ketones, e.g., diethylketone, methylisobutylketone, etc.; esters; nitriles; hydrocarbons, e.g., n-hexane, benzene, toluene, etc.; and chlorinated hydrocarbons such as carbon tetrachloride. Certain diploar aprotic solvents such as dimethyl sulfoxide, dimethylformamide, ethylene carbonate, tetrahydrothiophene - 1,1 - dioxide (commonly known as Sulfolane), etc. are especially good. Such polar solvents are preferred for some of the reactions in accordance with the invention because their use accelerates the reaction and increases the yield.

Both reactants can be added simultaneously to the reaction vessel or the ketene can be added to the ketene aminal. I generally avoid the inverse addition because ketene polymers are sometimes produced when the ketene aminal is added to the ketene.

The following examples illustrate the preparation of novel compounds in accordance with the invention.

*Example 1*

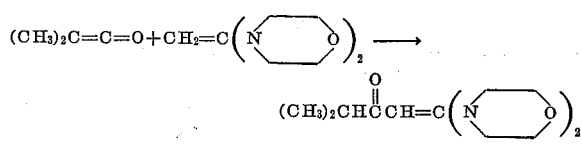

To a stirred solution of 57 g. (0.288 mole) of 4,4'-vinylidenedimorpholine in 150 ml. of benzene was added slowly 20.7 g. (0.295 mole) of dimethylketene. The reaction was exothermic and an ice bath was used to keep the reaction temperature at 20–35°. The solvent was stripped under vacuum to give practically a quantitative yield of crude product. This solid was recrystallized from hexane to give 57 g. (74%) of 4-methyl-1,1-dimorpholine-1-penten-3-one, M.P. 103.5–105°.

*Anal.*—Calcd. for $C_{14}H_{24}N_2O_3$: C, 62.7; H, 9.0; N, 10.4 Found: C, 62.4; H, 8.8; N, 10.0. The NMR spectrum of this material was in complete agreement with the structure shown.

Example 2

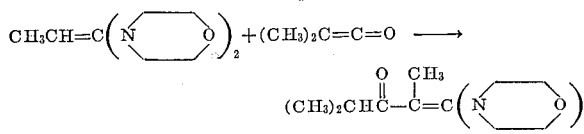

Using the method of Example 1, 42.4 g. (0.2 mole) of 4,4'-propenylidenedimorpholine in 150 ml. of benzene reacted with 14.0 g. (0.2 mole) of dimethylketene to give a high yield of crude 2,4-dimethyl-1,1-dimorpholino-1-penten-3-one. A sample for analysis that was recrystallized from a mixture of benzene and hexane melted at 155–157°.

Example 3

Under the general conditions of Example 1, the following ketenes and ketene aminals give the products shown:

Example 5

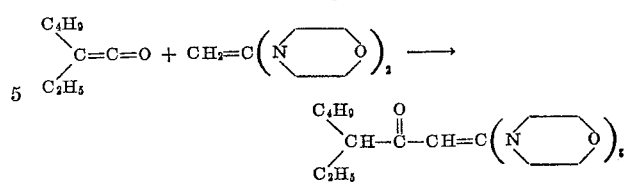

A mixture of 40 g. (0.2 mole) of 4,4'-vinylidenedimorpholine in 100 ml. of benzene was stirred under nitrogen at 9 to 16° C. while adding 25.5 g. (0.2 mole) of butylethylketene. The temperature was controlled by means of an ice bath. The reaction solution was stirred overnight at room temperature. Distillation through a 6-inch Vigreux column removed all low boiling material up to 175° at 0.4 mm. The residue (45 g.) was distilled in a molecular still to give 38 g. of 4-ethyl-1,1-dimorpholino-1-octen-3-one, B.P. 115–125° at one micron pressure. The infrared and NMR spectra agree with the structure shown above.

| Ketene | Ketene aminal | Product |
|---|---|---|
| $\mathrm{C_4H_9}$<br>$\mathrm{C_2H_5}$ $>$C=C=O | CH$_2$=C(N(CH$_2$-CH$_2$)$_2$CH$_2$)$_2$ | $\mathrm{C_4H_9}$<br>$\mathrm{C_2H_5}$ $>$CHCCH=C(N(CH$_2$-CH$_2$)$_2$CH$_2$)$_2$ |
| (C$_8$H$_{17}$)$_2$C=C=O | CH$_2$=C(N(CH$_2$-CH$_2$)$_2$)$_2$ | (C$_8$H$_{17}$)$_2$CHCCH=C(N(CH$_2$-CH$_2$)$_2$)$_2$ |
| cyclohexylidene ketene | CH$_2$=C(N(CH$_2$-CH$_2$)$_2$O)$_2$ | cyclohexyl-CHCCH=C(N(CH$_2$-CH$_2$)$_2$O)$_2$ |
| (C$_6$H$_5$)$_2$C=C=O | CH$_2$=C(N(CH$_3$)(C$_6$H$_5$))$_2$ | (C$_6$H$_5$)$_2$CHCCH=C(N(CH$_3$)(C$_6$H$_5$))$_2$ |

The novel compounds of the invention are useful principally as chemical intermediates. For example, they react with hydrazine to form pyrazoles which have a number of uses. For example, the pyrazoles can be employed as antioxidant additives for mineral lubricating oils in the manner of U.S. 2,971,912 or as stabilizers for poly(vinyl chloride) resins in the manner of U.S. 2,946,765.

The following example illustrates the preparation of such a substituted pyrazole from a product of the invention.

Example 4

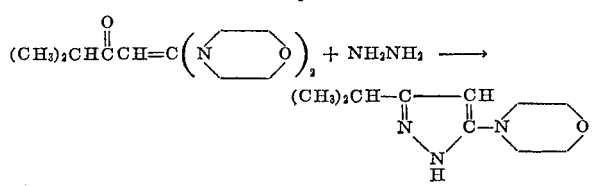

A solution of 0.64 g. (0.02 mole) of anhydrous hydrazine and 5.3 g. (0.02 mole) of 4-methyl-1,1-dimorpholino-1-penten-3-one in 20 ml. of ethanol was refluxed for 8 hrs. The reaction solution was stripped to low boilers under vacuum. The viscous residue crystallized slowly and was recrystallized from a mixture of hexane and benzene to give 2.4 g. of 3-isopropyl-5-morpholinopyrazole, M.P. 66–68°.

The next example illustrates the practice of the method of the invention in the absence of a solvent. The reactants are simply admixed, preferably in about equimolar proportions, and heated to reaction temperature for about 1 to 5 hours. Higher temperatures are used for the higher molecular weight reactants, e.g., 150 to about 200° C. being used for butylethylketene as in the following example, in order to obtain adequate yields in a relatively short time. Preferably the reaction is carried out in an inert atmosphere, e.g., under a blanket of nitrogen, to prevent formation of explosive peroxides.

Example 6

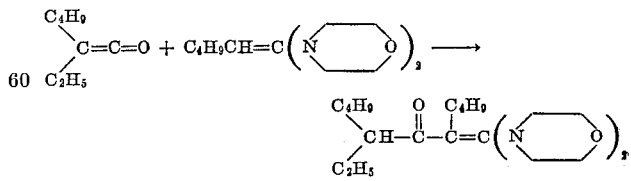

A mixture of 1.26 g. (0.01 mole) of butylethylketene and 2.54 g. (0.01 mole) of 4,4'-(1-hexenylidene)-dimorpholine is heated at 150° for 4 hrs. under nitrogen to give a good yield of crude 2-butyl-4-ethyl-1,1-dimorpholino-1-octen-3-one.

Although the invention has been described in considerable detail with particular reference to certain preferred embodiments thereof, it will be understood that variations and modifications can be effected within the spirit and scope of the invention as described hereinabove and as defined in the appended claims.

I claim:
1. A compound of the formula,

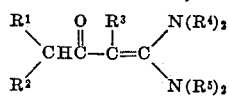

wherein $R^1$, $R^2$ and $R^3$, taken singly, are alkyl, cycloalkyl, phenyl, lower alkyl-substituted phenyl, lower alkoxy-substituted phenyl, thienyl, alkenyl, or carbalkoxy of up to 8 carbon atoms and, taken collectively, said $R^1$ and $R^2$ form a 4 to 6 membered saturated carbocylic ring with the common carbon to which they are attached; wherein the substituents $R^4$ and $R^5$ taken singly, are alkyl, cycloalkyl, phenyl or lower alkyl-substituted phenyl of up to 8 carbon atoms and wherein each pair of substituents $R^4$ and $R^5$ taken collectively, represent the atoms necessary to complete a heterocylic ring selected from the group consisting of piperidino, morpholino, thiamorpholino and pyrrolydinyl.

2. 4-methyl-1,1-dimorpholino-1-penten-3-one.
3. 2,4-dimethyl-1,1-dimorpholino-1-penten-3-one.
4. 4-ethyl-1,1-dimorpholino-1-octen-3-one.
5. 2-butyl-4-ethyl-1,1-dimorpholino-1-octen-3-one.

References Cited by the Examiner
UNITED STATES PATENTS
3,141,880  7/1964  Martin _____ 260—294.7

OTHER REFERENCES
Hasek et al., J. Org. Chem., volume 26, pages 4775-4776 (61).
Hasek et al., J. Org. Chem., volume 28, pages 1468-1474 (62).
Optiz et al., Angew Chem., volume 74, page 32 (1962).

JOHN D. RANDOLPH, *Acting Primary Examiner.*
WALTER A. MODANCE, *Examiner.*